(12) United States Patent
LeVasseur et al.

(10) Patent No.: US 11,796,331 B2
(45) Date of Patent: Oct. 24, 2023

(54) ASSOCIATING PERCEIVED AND MAPPED LANE EDGES FOR LOCALIZATION

(71) Applicant: GM Global Technology Operations LLC, Detroit, MI (US)

(72) Inventors: Peter Edward LeVasseur, Rochester Hills, MI (US); Brent Navin Roger Bacchus, Sterling Heights, MI (US); Tarek Abdel Raouf Abdel Rahman, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 17/401,893

(22) Filed: Aug. 13, 2021

(65) Prior Publication Data

US 2023/0050706 A1 Feb. 16, 2023

(51) Int. Cl.
*G01C 21/34* (2006.01)
*G01C 21/00* (2006.01)
*G01C 21/36* (2006.01)
*B60W 40/02* (2006.01)
*B60W 60/00* (2020.01)

(52) U.S. Cl.
CPC ......... *G01C 21/3453* (2013.01); *B60W 40/02* (2013.01); *B60W 60/001* (2020.02); *G01C 21/3691* (2013.01); *G01C 21/3885* (2020.08); *B60W 2552/53* (2020.02); *B60W 2556/50* (2020.02)

(58) Field of Classification Search
CPC ............ G01C 21/3453; G01C 21/3885; G01C 21/3691; B60W 60/001; B60W 40/02; B60W 2556/50; B60W 2552/53
See application file for complete search history.

(56) References Cited

U.S. PATENT DOCUMENTS

| | | | |
|---|---|---|---|
| 2009/0228204 A1* | 9/2009 | Zavoli | G01C 21/30 701/532 |
| 2023/0054914 A1* | 2/2023 | Mennen | G01C 21/3602 |

* cited by examiner

*Primary Examiner* — Anne Marie Antonucci
*Assistant Examiner* — Jingli Wang
(74) *Attorney, Agent, or Firm* — Vivacqua Crane, PLLC (57) ABSTRACT

A system for associating perceived and mapped lane edges can include a processor and a memory. The memory includes instructions such that the processor is configured to receive a sensor data representing a perceived object; receive map data representing a map object; determine a cost matrix a cost matrix indicative of an association cost for associating the map object to the perceived object; compare the association cost with an association cost threshold; and associate the perceived object with the map object based on the association cost.

20 Claims, 3 Drawing Sheets

ASSOCIATING PERCEIVED AND MAPPED LANE EDGES FOR LOCALIZATION

INTRODUCTION

The technical field generally relates to perception systems and methods, and more particularly relates to systems and methods for associating perceived objects with corresponding map data.

Autonomous and semi-autonomous vehicles typically require accurate perception of objects to object tracks. The perception of object tracks can be subject to perspective distortions. This results in incorrect lane identification of objects. In addition, the sensor data from the vehicle sensors and/or received map data may contain significant noise thus, further reducing the accuracy for identifying lane edges. Such discrepancies can be problematic because autonomous vehicles, in particular, require proper identification of lane edges on the roadways.

SUMMARY

A system includes a controller including a processor and a memory. The memory includes instructions such that the processor is configured to: receive a sensor data representing a perceived object; receive map data representing a map object; determine a cost matrix a cost matrix indicative of an association cost for associating the map object to the perceived object; compare the association cost with an association cost threshold; and associate the perceived object with the map object based on the association cost.

In other features, the perceived object represents a lane edge disposed on a roadway.

In other features, the map object represents a lane edge disposed on a roadway.

In other features, the controller is further configured to determine the cost matrix according to $C=[c_{ij}]$, where C represents the computed cost matrix and element $c_{ij}$ represents the association cost.

In other features, the element $c_{ij}$ is calculated according to $c_{ij} = c_{ij}^d + c_{ij}^t$, where $c_{ij}^d$ represents a distance cost between an ith map lane edge and a jth perceived lane edge, where $c_{ij}^t$ represents a type mismatch cost between the ith map lane edge and the jth perceived lane edge.

In other features, the distance cost is determined according to an average squared Mahalanobis distance calculation.

In other features, the type mismatch cost represents a calculated difference between lane marking types, where the type mismatch cost represents a calculated difference between lane marking types, where the cost difference is defined as a negative log likelihood of a probability that the lane marking types represent a same underlying lane edge.

A vehicle can include a system. The system can include a controller having a processor and a memory. The memory includes instructions such that the processor is configured to: receive a sensor data representing a perceived object; receive map data representing a map object; determine a cost matrix a cost matrix indicative of an association cost for associating the map object to the perceived object; compare the association cost with an association cost threshold; and associate the perceived object with the map object based on the association cost.

In other features, the perceived object represents a lane edge disposed on a roadway.

In other features, the map object represents a lane edge disposed on a roadway.

In other features, the controller is further configured to determine the cost matrix according to $C=[c_{ij}]$, where C represents the computed cost matrix and element $c_{ij}$ represents the association cost.

In other features, the element $c_{ij}$ is calculated according to $c_{ij} = c_{ij}^d + c_{ij}^t$, where $c_{ij}^d$ represents a distance cost between an ith map lane edge and a jth perceived lane edge, where $c_{ij}^t$ represents a type mismatch cost between the ith map lane edge and the jth perceived lane edge.

In other features, the distance cost is determined according to an average squared Mahalanobis distance calculation.

In other features, the type mismatch cost represents a calculated difference between lane marking types, where the type mismatch cost represents a calculated difference between lane marking types, wherein the cost difference is defined as a negative log likelihood of a probability that the lane marking types represent a same underlying lane edge.

A method can include receiving, via a controller, sensor data representing a perceived object; receiving map data representing a map object; determining a cost matrix indicative of an association cost for associating the map object to the perceived object; comparing the association cost with an association cost threshold; and associating the perceived object with the map object based on the association cost.

In other features, the perceived object represents a lane edge disposed on a roadway.

In other features, the map object represents a lane edge disposed on a roadway.

In other features, the controller is further configured to determine the cost matrix according to $C=[c_{ij}]$, where C represents the computed cost matrix and element $c_{ij}$ represents the association cost.

In other features, the element $c_{ij}$ is calculated according to $c_{ij} = c_{ij}^d + c_{ij}^t$, where $c_{ij}^d$ represents a distance cost between an ith map lane edge and a jth perceived lane edge, where $c_{ij}^t$ represents a type mismatch cost between the ith map lane edge and the jth perceived lane edge.

In other features, the distance cost is determined according to an average squared Mahalanobis distance calculation.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Autonomous and semi-autonomous vehicles are capable of sensing their environment and navigating based on the sensed environment. Such vehicles sense their environment using multiple types of sensing devices such as radar, lidar, image sensors, and the like. In such vehicles the sensed data can be fused together with map data to identify and track objects in the vicinity of the vehicles.

As discussed in greater detail herein, a system can associate perceived objects, such as lane edges, with corresponding objects within map data. For example, temporary perception or map glitches may cause future perceived object data and/or map data to be mismatched. The presently disclosed system associates the perceived object data and the corresponding map data based on previous probabilities of association. For example, the system may implement one or more cost matrices such that the system does not rely on future perceived object data and/or map data that may become corrupted.

Figure 1:
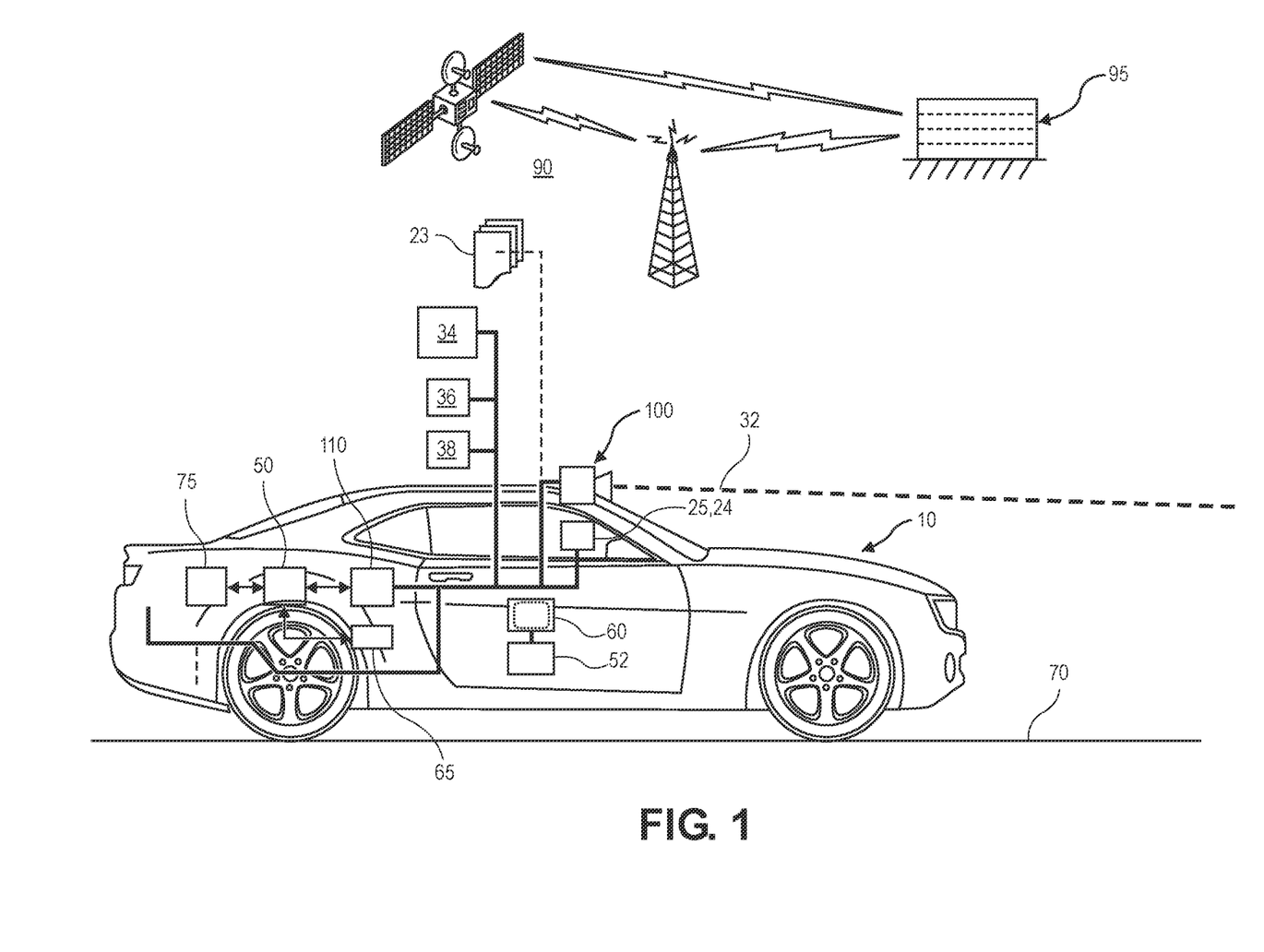
FIG. 1 depicts an example environment having a vehicle including a system that associates perceived and mapped lane edges.

FIG. 1 illustrates a side-view of a vehicle 10 disposed on and able to traverse a travel surface 70, such as a paved road surface. The vehicle 10 includes an on-board navigation system 24, a computer-readable storage device or media (memory) 23 that includes a digitized roadway map 25, a spatial monitoring system 100, a vehicle controller 50, a global positioning system (GPS) sensor 52, a human/machine interface (HMI) device 60, and in one embodiment an autonomous controller 65 and a telematics controller 75. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the spatial monitoring system 100 includes one or a plurality of spatial sensors and systems that are arranged to monitor a viewable region 32 that is forward of the vehicle 10, and a controller 110. The spatial sensors that are arranged to monitor the viewable region 32 forward of the vehicle 10 include, e.g., a lidar sensor 34, a radar sensor 36, a digital camera 38, etc. Each of the spatial sensors is disposed on-vehicle to monitor all or a portion of the viewable region 32 to detect proximate remote objects such as road features, lane markings, buildings, pedestrians, road signs, traffic control lights and signs, other vehicles, and geographic features that are proximal to the vehicle 10. The controller 110 generates digital representations of the viewable region 32 based upon data inputs from the spatial sensors.

The controller 110 can evaluate inputs from the spatial sensors to determine a linear range, relative speed, and trajectory of the vehicle 10 in view of each proximate remote object. The spatial sensors can be located at various locations on the vehicle 10, including the front corners, rear corners, rear sides and mid-sides. The spatial sensors can include a front radar sensor and a camera in one embodiment, although the disclosure is not so limited. Placement of the spatial sensors permits the controller 110 to monitor traffic flow including proximate vehicles, intersections, lane markings, and other objects around the vehicle 10. Data generated by the controller 110 may be employed by a lane marking detection processor (not shown) to estimate the roadway.

The spatial sensors of the vehicle spatial monitoring system 100 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

The lidar sensor 34 employs a pulsed and reflected laser beam to measure range or distance to an object. The radar sensor 36 employs radio waves to determine range, angle, and/or velocity of an object. The camera 38 includes an image sensor, lens, and a camera controller. The image sensor is an electro-optical device that converts an optical image into an electronic signal employing a multi-dimensional array of light-sensitive sensing elements. The camera controller is operatively connected to the image sensor to monitor the viewable region 32. The camera controller is arranged to control the image sensor to capture an image of a field of view (FOV) that is associated with the viewable region 32 that is projected onto the image sensor via the lens.

The optical lens may be configured to include features such as a pin-hole lens, a fisheye lens, a stereo lens, a telescopic lens, etc. The camera 38 periodically captures, via the image sensor, an image file associated with the viewable region 32 at a desired rate, e.g., 30 image files per second. Each image file is composed as a 2D or 3D pixelated digital representation of all or a portion of the viewable region 32 that is captured at an original resolution of the camera 38. In one embodiment, the image file is in the form of a 24-bit image including RGB (red-green-blue) visible light spectrum values and depth values that represent the viewable region 32. Other embodiments of the image file can include either a 2D or 3D image at some level of resolution depicting a black-and-white or a grayscale visible light spectrum representation of the viewable region 32, an infrared spectrum representation of the viewable region 32, or other image representations without limitation.

The image representations of the plurality of image files can be evaluated for parameters related to brightness and/or luminance in one embodiment. The image representations may be evaluated based upon RGB color components, brightness, texture, contour, or combinations thereof. The image sensor communicates with an encoder, which executes digital signal processing (DSP) on each image file. The image sensor of the camera 38 may be configured to capture the image at a nominally standard-definition resolution, e.g., 640×480 pixels. The image sensor of the camera 38 may be configured to capture the image at a nominally high-definition resolution, e.g., 1440×1024 pixels, or at another suitable resolution. The image sensor of the camera 38 may capture still images or digital video images at a predetermined rate of image capture. The image files are communicated to the camera controller as encoded datafiles that are stored in a non-transitory digital data storage medium in one embodiment for on-board or off-board analysis.

The camera 38 is advantageously mounted and positioned on the vehicle 10 in a location that permits capturing images of the viewable region 32, wherein at least a portion of the viewable region 32 includes a portion of the travel surface 70 that is forward of the vehicle 10 and includes a trajectory of the vehicle 10. The viewable region 32 may also include a surrounding environment, including, e.g., vehicle traffic, roadside objects, pedestrians, and other features, the sky, a horizon, the lane of travel and on-coming traffic forward of the vehicle 10. Other cameras (not shown) may also be employed, including, e.g., a second camera that is disposed on a rear portion or a side portion of the vehicle 10 to monitor rearward of the vehicle 10 and one of the right or left sides of the vehicle 10.

The autonomous controller 65 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip.

Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like.

The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls may be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, the global positioning system (GPS) sensor 52, the navigation system 24 and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems.

The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat.

The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The on-board navigation system 24 employs the digitized roadway map 25 for purposes of providing navigational support and information to a vehicle operator. The autonomous controller 65 employs the digitized roadway map 25 for purposes of controlling autonomous vehicle operation or ADAS vehicle functions.

The vehicle 10 may include a telematics controller 75, which includes a wireless telematics communication system capable of extra-vehicle communications, including communicating with a communication network 90 having wireless and wired communication capabilities.

The telematics controller 75 is capable of extra-vehicle communications that includes short-range vehicle-to-vehicle (V2V) communication and/or vehicle-to-everything (V2x) communication, which may include communication with an infrastructure monitor, e.g., a traffic camera. The telematics controller 75 has a wireless telematics communication system capable of short-range wireless communication to a handheld device, e.g., a cell phone, a satellite phone or another telephonic device. In one embodiment the handheld device includes a software application that includes a wireless protocol to communicate with the telematics controller 75, and the handheld device executes the extra-vehicle communication, including communicating with an off-board server 95 via the communication network 90. The telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.), which are indicated by memory 23. The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation.

Routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like.

The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
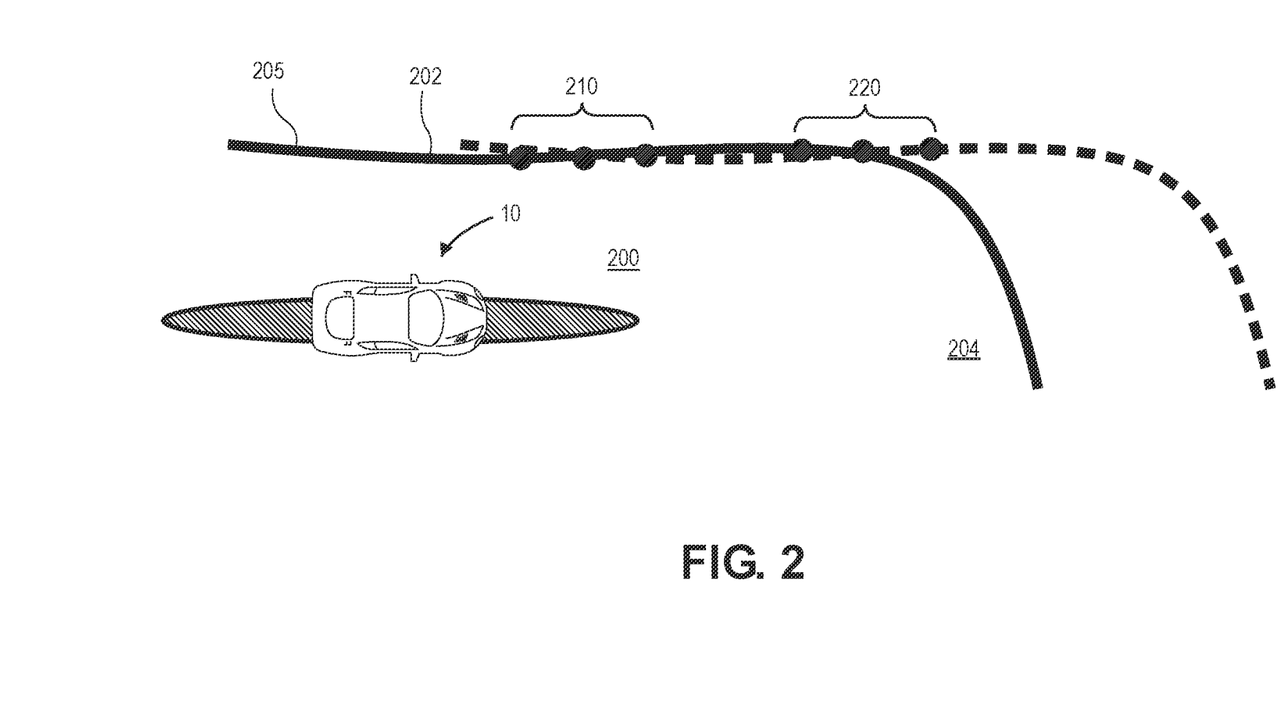
FIG. 2 depicts a diagrammatic plan view of a vehicle traversing a roadway.

FIG. 2 illustrates an example top view of a road segment 200, which may be a portion of a digitized roadway map 25 that may be employed by the vehicle 10. The example road segment 200 comprises a road element 202, such as a lane marking, having an upcoming turn 204. It is understood that the road segment 200 and the concept associated therewith may be applied to road segments that are configured as multi-lane roads. An edge portion 205 of the road segment is shown and represents a perceived lane marking.

A first set of points 210 are shown and represent geophysical locations of a plurality of lane markings 202 that are disposed at the edge portion 205 of the road segment 200 as perceived by one more of the spatial sensors of the vehicle spatial monitoring system 100. The first set of points 210 form a perceived lane marking defining the edge portion 205. A second set of points 220 represent map-based locations of the lane markings, e.g., lane edges 205, that are identified on the digitized roadway map 25 and correspond to individual ones of the lane markings 202.

As described in further detail herein, the controller 110 can calculate one or more cost matrices to determine whether a perceived object as represented by the first set of points 210 is associated, i.e., corresponds to, a map object as represented by the second set of points 220. Certain distortions within the map data and/or the sensor data may result in improper association or mismatching based on only geometric distance determinations.

As used herein, the present disclosure may refer to the second set of points 220 as map objects and/or map segments and may refer to the first set of points 210 as perceived objects and/or perceived segment for ease of readability. As used herein, the term "type" may be defined as lane marking type, and the term "color" may be defined as a color or hue of the lane marking. Using the techniques described herein, the controller 110 can determine a similarities between lane edge types and colors to increase proper associations between perceived objects and the corresponding object within the map data.

The perceived object data, e.g., the first set of points 210, can be received by the controller 110 and converted from a host vehicle reference, i.e., ego vehicle 10, to a global reference frame representation. For example, the controller 110 can convert the perceived data according to Equation 1:

$$x_g = Rx_e + x_p,\qquad \text{Equation 1,}$$

where $x_g$ is the position vector of the point in a global reference frame, $x_e$ is the position vector of the point in host vehicle coordinates, $x_p$ is the position vector of the host vehicle in a global reference frame and R is a rotation matrix that maps perception data from the host vehicle reference to the corresponding global reference frame representation that is dependent on the heading of the vehicle in the global reference frame.

The controller 110 can compute a cost matrix according to Equation 2, $$C = [c_{ij}]\qquad \text{Equation 2,}$$

where C is the computed cost matrix and element $c_{ij}$ represents the cost of associating, i.e., an association cost, a mapped object with a perceived object]. The costs can comprise a combination of a distance $c_{ij}^d$ between i (where i represents the ith map lane edge or segment) and j (where j represents the jth perceived lane edge or segment) and a type mismatch cost $c_{ij}^t$, which is the cost of associating i (where i represents the ith map lane edge or segment) with type $t_i$ with j (where j represents the jth perceived lane edge or segment) with type $t_j$ according to Equation 3:

$$c_{ij} = c_{ij}^d + c_{ij}^t\qquad \text{Equation 3.}$$

The type mismatch cost $c_{ij}^t$ may typically be small if two objects, e.g., a perceived object and a map object, are of the same type and infinity if the two objects are incompatible. The cost may be interpreted as the negative log-likelihood of the data given an assumed probability distribution.

The controller 110 can determine an average squared Mahalanobis distance $d_{ij}^2$ between $\{m_{i,k}\}$ points in map segment i and the points $\{p_{j,k}\}_{k=1}^P$ in perception segment j according to Equation 4 (subscripts i and j have been dropped for convenience):

$$d^2 = \frac{1}{M} e^T \sum\nolimits^{-1} e,\qquad \text{Equation 4}$$

where $e=(e_k)_{k=1}^M$ comprises a vector of lateral distances between points $\{m_{i,k}\}$ and $\{p_{j,k}\}$ and $\Sigma$ is a covariance term.

The lateral distance can be calculated according to Equation 5:

$$e_k = u_k^T(m_k = p_{k'})  \quad \text{Equation 5,}$$

where $p_{k'}$ comprises the nearest, e.g., closest, perception point to and $$u_k^T = \left(\cos\left(\theta_k + \frac{\pi}{2}\right)\sin\left(\theta_k + \frac{\pi}{2}\right)\right),$$

where $\theta_k$ is the angle of tangent to point $m_k$. The longitudinal distance $d_{lon.k}$ between the points is also calculated by the controller 110, and the distance d is set to infinity if the longitudinal distance is larger than a threshold $T_{log}$, where $d_{lon.k} = v_k^T(m_k - P_{k'})$ and $(\cos(\theta_k) \sin(\theta_k))$.

The covariance $\Sigma$ can be defined as $\Sigma = \Sigma_{percep} + \Sigma_{pose}$ where $\Sigma_{percep}$ is a diagonal matrix with $[\text{diag}(\Sigma_{percep})]_k = \sigma_k^2$, where $\sigma_k^2$ is the lateral variance of the perception point nearest to $m_k$, and $\Sigma_{pose} = U\Sigma_t U^T$, where $\Sigma_t$ is the covariance of the vehicle 10 pose and $U^T = (u_O \ldots u_M)$.

The average weighted lateral Euclidean distance r can be calculated according to $\sigma^2 \Sigma_k \sigma_{k'}^{-2} |m_k - p_k|$, where $\sigma^2 = (\Sigma_k \sigma_{k'}^{-2})^{-1}$. It is understood that every map segment i and perception segment j can be associated with $d_{ij}$ and $r_{ij}$.

The controller 110 can further determine a lane marking type and/or a color cost. The type and/or color cost is calculated such that the type and/or color cost is relatively smaller when perception and map types are determined to be the same and relatively higher when the perception and map types are determined to be different. The type cost $c_{ij}^t$ for lane edges can be calculated according to Equation 6, $$c_{i,j}^{tc} = -\ln[(p(m_i^{at}|m_i^{rt}) \cdot p(p_j^{at}|p_j^{rt}))(p(m_i^{ac}|m_i^{rc}) \cdot p(p_j^{ac}|p_j^{rc}))] \quad \text{Equation 6,}$$

where $P(m_i^{at}|m_i^{rt})$ represents a probability distribution of a true type of map lane edge i given a reported type, $p(m_i^{ac}|m_i^{rc})$ represents a probability distribution of the true color of map lane edge i given the reported color, $p(p_j^{at}|p_j^{rt})$ represents a probability distribution of the type perception lane edge j given the reported type, $P(p_j^{ac}|p_j^{rc})$ is a probability distribution of the color of the perception lane edge j given the reported color, and $(p(m_i^{at}|m_i^{rt}) \cdot p(p_j^{at}|p_j^{rt}))$ represents a dot product of the map and the perception distributions over types and represents how similar two map and perception lane edges are to one another based on type.

Each perception lane edge and map lane edge comprise multiple points associated with the respective type of lane edge. A lane edge's type $t_i$ can be defined as a mode of the lane edge's segment types, and an online confidence of the lane edge segment's type $t_i$ can be defined as $p(m_i = t_i)$, which is computed by the controller as an average of the type of confidence of each point that matches a type mode in the lane edge segment.

The controller 110 can use marginal probability to determine a probability of an actual type and color given a reported type, reported color, confusion matrices, and a prior on types that exist. For example, the probability of the actual type can be calculated according to Equation 7:

$$p(m_i^{at} \mid m_i^{rt}) = \sum_b p(t = a \mid r = b) l_i(r_b), \quad \text{Equation 7}$$

where $p(t=a|r=b)$ represents an entry from a transposed confusion matrix and describes a probability of an actual type given a reported type, $l_i(r_b)$ represents an entry from the ith map lane edge's type likelihood vector, and the type likelihood vector represents a probability of the reported type. It is understood that Equation 7 illustrates calculating an actual type corresponding to a map; however, the same formulation can be used to compute for perception or map and/or color or type.

Within the present context, a confusion matrix describes the probability of a reported type given an actual type based on a test set of example data. For example, the controller 110 can implement Bayes' Theorem to transpose the map and perception type confusion matrices and the color confusion matrices to identify a probability of an actual type given a reported type. The controller 110 can determine a transposed confusion matrix according to Equation 8:

$$p(t = a \mid r = b) = \frac{p(r = b \mid t = a)\, p(t = a)}{\sum_a p(r = b \mid t = a)\, p(t = a)}, \quad \text{Equation 8}$$

where $p(r=b|t=a)$ represents an entry from the map type confusion matrix corresponding to the actual type a and reported type b, and where $p(t=a)$ is a prior on the distribution of existing types. In some instances, a uniform distribution is used for the prior unless additional information is available for the types.

The controller 110 can also split perceived lane edges at boundaries of mapped lane segments. In some instances, perceived lane edges may span more than one mapped lane segment, which could violate a 1:1 mapping rule for output data. In various implementations, the controller 110 splits a perceived lane edge into segments when the closest map lane edge segment point is the last point in the segment.

In some implementations, the controller 110 splits perceived and mapped lane edges longitudinally on type to allow association based on types. For example, a type lane splitting protocol may account for noise in the classification of lanes, such as temporary changes in types for a small distance. To account for classification noise, a suitable filtering process is used for each lane edge that breaks a segment into two if within a sliding window of n points, where more than k of the points are of a different type. The ratio of n with k and how large n is determines how sensitive the splitting protocol should be to noise. For example, with n=5 and k=2 could correspond to that within 5 points, a split would occur only if within a window of 5 points that 3 or more points were different in type.

The term $q_{pm}$ can be defined as the probability that perception lane index $\tilde{P}$ is associated with map lane edge index $\tilde{M} = 1 \ldots M$, with a special case to signify that $\tilde{P}$ that there is no association between the perception lane edge index and the map lane edge index. As used herein, distance and/or type measurements at time t can be denoted by a vector $z^{(t)}$.

As discussed herein, the controller 110 can use Bayes' Theorem to determine a probability that a perception lane edge corresponds to a map lane edge. The prior probability that a perception lane edge is associated with map lane edge m can be calculated according to Equation 9:

$$q_m^{(0)} = P(\tilde{M}^{(0)} = m) \quad \text{Equation 9}$$

$$= \begin{cases} \frac{1}{M} P_{inlier}, & m \neq 0 \\ 1 - P_{inlier} & m = 0 \end{cases}$$

where m=0 corresponds to an outlier, i.e., no association, and $P_{inlier}$ comprises the inlier probability.

Given $q_m^{(t-1)} = P(\tilde{M}^{(t-1)} = m | z^{0:(t-1)})$, i.e., the probability of association at a prior time step, the predicted probability $q_m^{(t)-} = P(\tilde{M}^{(t)} = m | z^{0:(t-1)})$ can be defined according to Equation 10:

$$q_m^{(t)-} = \frac{1}{Z} q_m^{(t-1)} \frac{q_m^{(0)} + \alpha}{q_m^{(t-1)} + \alpha}, \qquad \text{Equation 10}$$

where $$Z = \sum_m \frac{q_m^{(t-1)}(q_m^{(0)} + \alpha)}{q_m^{(t-1)} + \alpha}$$

is a normalization term and $1/a$ is a pseudo-count.

The generated prediction includes the properties that $\lim_{a \to \infty} q_m^{(t)-} = q_m^{(t-1)}$, i.e., the previous posterior, and $\lim_{a \to 0} q_m^{(t)-} = q_m^{(0)}$, i.e., the prior. Based on these properties, a dictates how much of the previous probability is retained and how much the predictions revert to the prior probability. the controller 110 can calculate the prediction probability $q_m^{(t)-}$ by accounting the neighboring associations' contributions $\tilde{M}^{(t-1)} = m_i$ to the evolution towards $\tilde{M}^{(t)} = m$, according to Equation 11:

$$q_m^{(t)-} = \frac{1}{Z} \sum_i \exp(-\Delta_i^T \Sigma^{-1} \Delta_i) q_{m_i}^{(t-1)}, \qquad \text{Equation 11}$$

where $\Sigma = aI$ is a diagonal matrix having a tuning parameter a and $\Delta_i = m_i^{(t-1)} - m^t$. In order to predict the associations probability for $q_m^{(t)-}$, Equation 8 factors in all possible candidates $\tilde{M}^{(t-1)} = m_i$ at time step t−1 by marginalizing over $\tilde{M}^{(t-1)} = m_i$ and weighting them with their corresponding posterior probability $q_{m_i}^{(t-1)}$. The Mahalanobis distance $\Delta_i^T \Sigma^{-1} \Delta_i$ provides additional spatial weighting, such that nearby candidates are provided higher contribution weights during prediction.

A likelihood $l_m = P(z^{(t)} | M^{(t)} = m)$ of $z_t$ can be given by Equation 12:

$$l_m = \begin{cases} l_t^{(t)} l_d^{(t)} & m \neq 0 \\ \mathcal{U}(d^{(t)} | a, b) & m = 0 \end{cases}, \qquad \text{Equation 12}$$

where $u(p|a, b)$ is the likelihood of a multivariate uniform distribution having lower bounds a and b, respectively, at p and $l_t^{(t)}$ and $l_d^{(t)}$ are the type and distance likelihoods, respectively.

The outlier likelihood, e.g., where m=0, comprises a product of two independent uniform distributions in which one of the distributions corresponds to the distance and the other distribution corresponds to the type. In an example implementation, the type likelihood can be written as $l_t = \Pi N_i^{-1}$ in which $N_i$ is the cardinality of the discrete variable in dimension i, e.g., for dimensions color ∈ yellow, white, and road and style e dashed, solid then $l_t = \frac{1}{6}$. The range [a, b] for the distance should be large enough to cover the realistic observations. The cost and likelihood are related by $c = -\ln l$ such that $-\ln l_t^{(t)} \ln l_d^{(t)} = c_t + c_d$, which is the sum of the type and squared Mahalanobis distance costs, respectively.

The posterior probability that perception lane edge p is a noisy realization of map lane edge m given prior probabilities {q-} is given by Equation 13:

$$q_m^{(t)} = P(\tilde{M}^{(t)} = m | z^{(0:t)}) = \begin{cases} \dfrac{l_m q_m^{(t)-}}{\sum_{m \neq 0} l_m q_m^{(t)-} + l_0 q_0^{(t)-}}, & m \neq 0 \\ 1 - \sum_{m \neq 0} q_m^{(t)}, & m = 0 \end{cases} \qquad \text{Equation 13}$$

Referring to the perception index p, all probabilities can be collected into the P×M posterior probability matrix Q $[q_{pm}]$ where the outlier probabilities corresponding to m=0 are removed. The probability matrix can then be converted to a cost matrix according to $C = -\ln Q$, where $\ln(\cdot)$ is applied elementwise.

In some implementations, the controller 110 can compute $d_{ij}$ by identifying candidates from the map are found by selecting the k nearest neighbors within a maximum distance $D_{candidate}$ to each candidate from perception, which can be computed using suitable Euclidean distance determinations and k-d trees.

In some implementations, the controller 110 splits perceived and mapped lane edges longitudinally on type to allow association based on types. For example, a type lane splitting protocol may account for noise in the classification of lanes, such as temporary changes in types for a small distance. To account for classification noise, a suitable filtering process is used for each lane edge that breaks a segment into two if within a sliding window of n points, where more than k of the points are of a different type. The ratio of n with k and how large n is determines how sensitive the splitting protocol should be to noise. For example, with n=5 and k=2 could correspond to that within 5 points, a split would occur only if within a window of 5 points that 3 or more points were different in type.

The controller 110 selects an association among multiple associates based on a calculated cost matrix. The cost matrix represents the costs of multiple potential associations between the first set of points 210 and the second set of points 220. In an example implementation, the cost matrix can be calculated according to the Kuhn Munkres algorithm. In an example implementation, the cost matrix is augmented with dummy rows and columns with value $c_{skip}$ that represents the cost of no assignment for all perception and map candidates to allow for objects from perception and map to potentially remain unassigned. The controller 110 can disregard solutions involving dummy entries, and the controller 110 performs no association determination if only dummy entries are included within the calculated solution.

The controller 110 halts determining an association between the first set of points 210 and the second set of points 220 if the controller 110 determines there are multiple solutions having similar costs to avoid selection of an ambiguous solution. The controller 110 can determine whether there are multiple solutions having similar costs by comparing a difference between a total cost c1 from solution $S_1$ to total cost c2 from solution $S_2$. The controller 110 compares the difference to a cost threshold $\Delta c_{ignore}$. For example, the total costs are calculated according to Equation 14:

$$c_k = \sum_{i,j \in S_k} c_{ij}, \qquad \text{Equation 14}$$

where $c_k$ represents a cost based on a summation of $c_{ij}$. If the controller 110 determines that $|c_1-c_2|<\Delta c_{ignore}$, the controller 110 does not associate the perceived object, e.g., the first set of points 210, and the object depicted within the map data, e.g., the second set of points 220. Otherwise, the controller 110 associates the perceived object and the object depicted within the map data that indicates the perceived object is the object within the map data. In various implementations, the $|c_1-c_2|$ value can represent the association cost and $\Delta c_{ignore}$ can represent an association cost threshold. A second solution $S_2$ that has no assignments in common with the optimal solution $S_1$ can be found by setting the entries in the cost matrix corresponding to $S_1$ to infinity such that $\forall_{i,j\in S1} c_{i,j}=\infty$ and repeating the cost calculation according to Equation 7.

The controller 110 selects the solution $S_1$ when none of the Euclidean distances $r_{ij}$ is statistically significant than a predetermined maximum distance. The controller 110 does not associate the first set of points 210 and the second set of points 220 when $$r_{ij}\left(1+\frac{k}{d_{ij}}\right) > r_{max},$$

where $i,j=\text{argmax}_{i,j\in S1} r_{ij}$ and k represents a number of standard deviations used to determine significance, e.g., k=2 for a confidence level of about 95%. The solution $S_1$ can represent the association between the perceived lane edge and the lane edge represented within the map.

Figure 3:
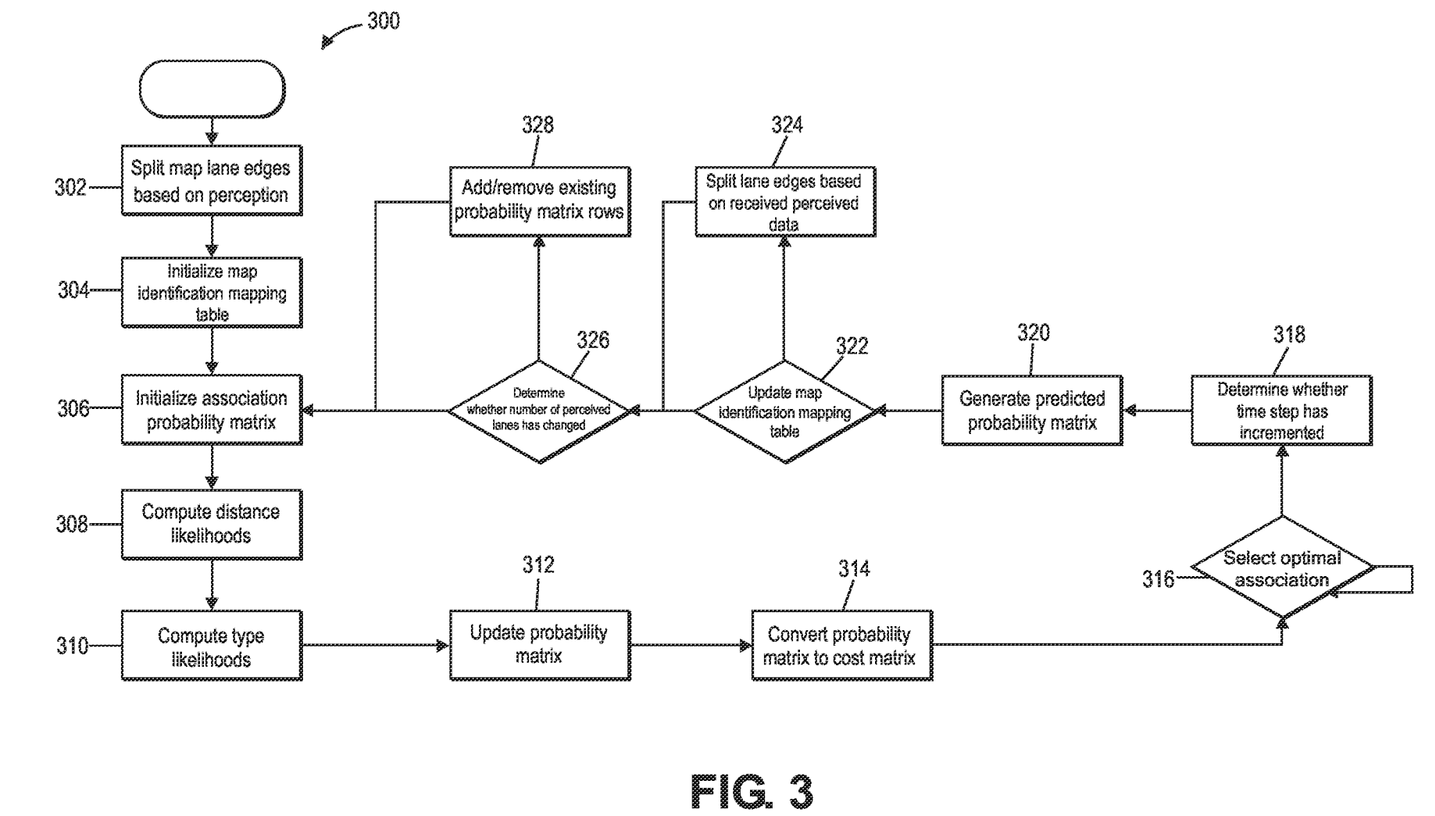
FIG. 3 is a flow diagram illustrating a process for associating perceived and mapped lane edges.

FIG. 3 illustrates an example process 300 for that associates, e.g., determines each lane edge is the same, a perceived lane edge with a corresponding lane edge represented in map data. The process 300 can comprise software instructions executable by the controller 110.

At block 302, the controller 110 splits map lane edges based on perception. At block 304, the controller 110 initializes a perception/map identification mapping table. At block 306, the controller 110 initializes an association probability matrix with prior probability data.

Using the techniques described in greater detail above, the controller 110 computes a distance likelihood between each map/perception pair at block 308. At block 310, the controller 110 computes a type likelihood between each map/perception pair. At block 312, the controller 110 updates the probability matrix with the overall likelihood calculated in blocks 308, 310. At block 314, the controller 110 converts the probability matrix to a cost matrix using a suitable negative log transform function.

At block 316, the controller 110 selects an optimal association using the total cost calculation described above with respect to Equation 7. At block 318, the controller 110 determines whether a time stamp has incremented. For example, the controller 110 determines whether the perceived data receives includes a time stamp that is incremented with respect to the previously received time stamps. If the time stamp has not increased, the process 300 returns to block 318. Otherwise, at block 320, the controller 110 generates a predicted probability matrix. Based on the predicted probability matrix, the controller 110 updates the perception/map identification mapping table at block 322. At block 324, the controller 110 splits lane edges based on the received perceived data.

At block 326, the controller 110 determines whether the number of perceived lanes has changed. If the number of perceived lanes has changed, the controller 110 can add or remove existing probability matrix rows and/or redistribute the new probability matrix rows with prior data at block 328. At block 330, the controller 110 determines whether the number of lanes within the map data has changed. If the number of lanes within the map data changed, the controller 110 adds or deletes columns and redistributes the probabilities. The process 300 can then return to block 308.

While at least one exemplary implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

The detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Implementations of the present disclosure may be described herein in terms of functional and/or logical block components and various processing steps. It should be appreciated that such block components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely exemplary implementations of the present disclosure.

What is claimed is:

1. A system comprising a controller including a processor and a memory, the memory including instructions such that the processor is configured to:
   receive a sensor data representing a perceived object;
   receive map data representing a map object;
   determine a cost matrix indicative of an association cost for associating the map object to the perceived object, wherein the cost matrix is determined according to $C=[c_{ij}]$, wherein C represents the computed cost matrix and element $c_{ij}$ represents the association cost, wherein the element $c_{ij}$ is calculated according to $c_{ij}=c_{ij}^{d}+c_{ij}^{t}$, wherein $c_{ij}^{d}$ represents a distance cost between an ith map lane edge and a jth perceived lane edge, and wherein $c_{ij}^{t}$ represents a type mismatch cost between the ith map lane edge and the jth perceived lane edge;

compare the association cost with an association cost threshold;

determine an association between the perceived object and the map object based on the association cost; and adjust at least one of: a lane guidance operation, a lane keeping operation, a lane change operation, and a steering assist operation of an autonomous vehicle based at least in part on the association between the perceived object and the map object.

2. The system as recited in claim 1, wherein the perceived object represents a lane edge disposed on a roadway.

3. The system as recited in claim 1, wherein the map object represents a lane edge disposed on a roadway.

4. The system as recited in claim 1, wherein the distance cost is determined according to an average squared Mahalanobis distance calculation.

5. The system as recited in claim 1, wherein the type mismatch cost represents a calculated difference between lane marking types, wherein the cost difference is defined as a negative log likelihood of a probability that the lane marking types represent a same underlying lane edge.

6. A vehicle including a system, the system comprising a controller including a processor and a memory, the memory including instructions such that the processor is configured to:

receive a sensor data representing a perceived object;

receive map data representing a map object;

determine a cost matrix indicative of an association cost for associating the map object to the perceived object, wherein the cost matrix is determined according to $C=[c_{ij}]$, wherein C represents the computed cost matrix and element $c_{ij}$ represents the association cost, wherein the element $c_{ij}$ is calculated according to $c_{ij}=c_{ij}^{d}+c_{ij}^{t}$, wherein $c_{ij}^{d}$ represents a distance cost between an ith map lane edge and a jth perceived lane edge, and wherein $c_{ij}^{t}$ represents a type mismatch cost between the ith map lane edge and the jth perceived lane edge;

compare the association cost with an association cost threshold;

determine an association between the perceived object and the map object based on the association cost; and adjust at least one of: a lane guidance operation, a lane keeping operation, a lane change operation, and a steering assist operation of an autonomous vehicle based at least in part on the association between the perceived object and the map object.

7. The vehicle as recited in claim 6, wherein the perceived object represents a lane edge disposed on a roadway.

8. The system as recited in claim 6, wherein the map object represents a lane edge disposed on a roadway.

9. The system as recited in claim 6, wherein the distance cost is determined according to an average squared Mahalanobis distance calculation.

10. The system as recited in claim 6, wherein the type mismatch cost represents a calculated difference between lane marking types, wherein the cost difference is defined as a negative log likelihood of a probability that the lane marking types represent a same underlying lane edge.

11. A method comprising:

receiving, via a controller, sensor data representing a perceived object;

receiving map data representing a map object;

determining a cost matrix indicative of an association cost for associating the map object to the perceived object, wherein the cost matrix is determined according to $C=[c_{ij}]$, wherein C represents the computed cost matrix and element c represents the association cost, wherein the element $c_{ij}$ is calculated according to $c_{ij}=c_{ij}^{d}+c_{ij}^{t}$, wherein $c_{ij}^{d}$ represents a distance cost between an ith map lane edge and a jth perceived lane edge, and wherein $c_{ij}^{t}$ represents a type mismatch cost between the ith map lane edge and the jth perceived lane edge;

comparing the association cost with an association cost threshold;

determining an association between the perceived object and the map object based on the association cost; and adjusting at least one of: a lane guidance operation, a lane keeping operation, a lane change operation, and a steering assist operation of an autonomous vehicle based at least in part on the association between the perceived object and the map object.

12. The method as recited in claim 11, wherein the perceived object depicts a lane edge disposed on a roadway.

13. The method as recited in claim 11, wherein the map object depicts a lane edge disposed on a roadway.

14. The method as recited in claim 11, wherein the distance cost is determined according to an average squared Mahalanobis distance calculation.

15. The system as recited in claim 1, wherein to determine the cost matrix, the processor is further configured to split the jth perceived lane edge at a boundary of a mapped lane segment in response to determining that a closest map lane edge segment point is a last point in the mapped lane segment.

16. The system as recited in claim 1, wherein to determine the cost matrix, the processor is further configured to:

compute a distance likelihood between the ith map lane edge and the jth perceived lane edge;

compute a type likelihood between the ith map lane edge and the jth perceived lane edge; and determine the cost matrix based at least in part on the distance likelihood and the type likelihood.

17. The system as recited in claim 6, wherein to determine the cost matrix, the processor is further configured to split the jth perceived lane edge at a boundary of a mapped lane segment in response to determining that a closest map lane edge segment point is a last point in the mapped lane segment.

18. The system as recited in claim 6, wherein to determine the cost matrix, the processor is further configured to:

compute a distance likelihood between the ith map lane edge and the jth perceived lane edge;

compute a type likelihood between the ith map lane edge and the jth perceived lane edge; and determine the cost matrix based at least in part on the distance likelihood and the type likelihood.

19. The method as recited in claim 1, wherein determining the cost matrix further comprises splitting the jth perceived lane edge at a boundary of a mapped lane segment in response to determining that a closest map lane edge segment point is a last point in the mapped lane segment.

20. The method as recited in claim 11, wherein determining the cost matrix further comprises:

computing a distance likelihood between the ith map lane edge and the jth perceived lane edge;

computing a type likelihood between the ith map lane edge and the jth perceived lane edge; and determining the cost matrix based at least in part on the distance likelihood and the type likelihood.

* * * * *